United States Patent
Chakraborty

(10) Patent No.: US 7,859,411 B2
(45) Date of Patent: Dec. 28, 2010

(54) RFID TAGGED ITEM TRAJECTORY AND LOCATION ESTIMATION SYSTEM AND METHOD

(75) Inventor: Sayan Chakraborty, Niwot, CO (US)

(73) Assignee: SkyeTek, Inc., Westminster, CO (US)

( * ) Notice: Subject to any disclaimer, the term of this patent is extended or adjusted under 35 U.S.C. 154(b) by 417 days.

(21) Appl. No.: 12/055,275

(22) Filed: Mar. 25, 2008

(65) Prior Publication Data

US 2008/0291041 A1     Nov. 27, 2008

Related U.S. Application Data

(60) Provisional application No. 60/908,999, filed on Mar. 30, 2007.

(51) Int. Cl.
*G08B 13/14* (2006.01)

(52) U.S. Cl. .................. 340/572.1; 235/385; 340/10.1; 705/22; 705/28

(58) Field of Classification Search .............. 340/572.1, 340/10.1, 825.54; 705/22, 28; 235/383, 235/385; 700/215
See application file for complete search history.

(56) References Cited

U.S. PATENT DOCUMENTS

| | | | |
|---|---|---|---|
| 3,842,350 A | 10/1974 | Gross | |
| 4,093,919 A | 6/1978 | Watanabe | |
| 5,013,898 A | 5/1991 | Glasspool | |
| 5,455,575 A | 10/1995 | Schuermann | |
| 5,519,381 A | 5/1996 | Marsh et al. | |
| 5,745,037 A | 4/1998 | Guthrie et al. | |
| 5,751,220 A | 5/1998 | Ghaffari | |
| 5,777,561 A | 7/1998 | Chieu et al. | |
| 5,887,176 A | 3/1999 | Griffith et al. | |

(Continued)

FOREIGN PATENT DOCUMENTS

EP     1772812 A2     4/2007

(Continued)

OTHER PUBLICATIONS

PCT/US06/015092 International Search Report & Written Opinion mailed Aug. 23, 2007.

(Continued)

*Primary Examiner*—Brent Swarthout
(74) *Attorney, Agent, or Firm*—Lathrop & Gage LLP

(57) ABSTRACT

A system for predicting a trajectory of an item tagged with an RFID tag. The system includes a network of communicatively coupled RFID readers, each having tag cache memory, and a search engine communicatively coupled with the tag caches in each of the readers. When a tag is within operating range of one of the readers, the tag is interrogated for its data and path information comprising timestamps of reader-tag interactions and related event data, and updated path information is stored in the tag cache memory. The search engine performs a search the tag cache memory in one of one of the readers to locate information corresponding to search criteria including characteristics of the tagged item sought. When the information corresponding to the search criteria is found, the path information is retrieved, and the trajectory of the item is extrapolated using a transit time of the item and average velocity of the item, determined from the timestamps and known distances between locations of each of the reader-tag interactions, along an expected path of the item.

20 Claims, 4 Drawing Sheets

U.S. PATENT DOCUMENTS

| | | | |
|---|---|---|---|
| 5,920,261 | A | 7/1999 | Hughes et al. |
| 5,929,779 | A | 7/1999 | MacLellan et al. |
| 5,952,922 | A | 9/1999 | Shober |
| 6,078,251 | A | 6/2000 | Landt et al. |
| 6,161,724 | A | 12/2000 | Blacker et al. |
| 6,182,214 | B1 | 1/2001 | Hardjono |
| 6,192,222 | B1 | 2/2001 | Greef et al. |
| 6,259,367 | B1 | 7/2001 | Klein |
| 6,304,613 | B1 | 10/2001 | Koller et al. |
| 6,317,027 | B1 | 11/2001 | Watkins |
| 6,377,176 | B1 | 4/2002 | Lee |
| 6,420,961 | B1 | 7/2002 | Bates et al. |
| 6,483,427 | B1 | 11/2002 | Werb |
| 6,496,806 | B1 | 12/2002 | Horwitz et al. |
| 6,509,828 | B2 | 1/2003 | Bolavage et al. |
| 6,526,264 | B2 | 2/2003 | Sugar et al. |
| 6,531,957 | B1 | 3/2003 | Nysen |
| 6,539,422 | B1 | 3/2003 | Hunt |
| 6,617,962 | B1 | 9/2003 | Horwitz et al. |
| 6,677,852 | B1 | 1/2004 | Landt |
| 6,717,516 | B2 | 4/2004 | Bridgelall |
| 6,903,656 | B1 | 6/2005 | Lee |
| 6,959,229 | B2 * | 10/2005 | Eidemiller .................. 700/226 |
| 6,985,931 | B2 | 1/2006 | Dowling |
| 6,992,567 | B2 | 1/2006 | Cole et al. |
| 7,026,935 | B2 | 4/2006 | Diorio et al. |
| 7,075,412 | B1 | 7/2006 | Reynolds et al. |
| 7,197,279 | B2 | 3/2007 | Bellantoni |
| 7,245,221 | B2 * | 7/2007 | Claudatos et al. ........ 340/572.1 |
| 7,367,020 | B2 | 4/2008 | Bickle et al. |
| 7,375,616 | B2 | 5/2008 | Rowse et al. |
| 7,378,967 | B2 | 5/2008 | Sullivan |
| 2002/0036569 | A1 | 3/2002 | Martin |
| 2002/0131595 | A1 | 9/2002 | Ueda et al. |
| 2003/0007473 | A1 | 1/2003 | Strong et al. |
| 2003/0055667 | A1 | 3/2003 | Sgambaro et al. |
| 2003/0081785 | A1 | 5/2003 | Boneh et al. |
| 2003/0173403 | A1 | 9/2003 | Vogler |
| 2004/0069852 | A1 | 4/2004 | Seppinen et al. |
| 2004/0087273 | A1 | 5/2004 | Perttila et al. |
| 2004/0089707 | A1 | 5/2004 | Cortina et al. |
| 2004/0118916 | A1 | 6/2004 | He |
| 2004/0176032 | A1 | 9/2004 | Kotola et al. |
| 2004/0179684 | A1 | 9/2004 | Appenzeller et al. |
| 2004/0212493 | A1 | 10/2004 | Stilp |
| 2004/0232220 | A1 | 11/2004 | Beenau et al. |
| 2005/0036620 | A1 | 2/2005 | Casden et al. |
| 2005/0063004 | A1 | 3/2005 | Silverbrook |
| 2005/0083180 | A1 | 4/2005 | Horwitz et al. |
| 2005/0088299 | A1 | 4/2005 | Bandy et al. |
| 2005/0105600 | A1 | 5/2005 | Culum et al. |
| 2005/0111618 | A1 * | 5/2005 | Sommer et al. ............... 378/57 |
| 2005/0116813 | A1 | 6/2005 | Raskar |
| 2005/0246248 | A1 * | 11/2005 | Vesuna ........................ 705/28 |
| 2006/0006986 | A1 | 1/2006 | Gravelle et al. |
| 2006/0022815 | A1 | 2/2006 | Fischer et al. |
| 2006/0038659 | A1 | 2/2006 | Takano et al. |
| 2006/0238305 | A1 | 10/2006 | Loving et al. |
| 2007/0001813 | A1 | 1/2007 | Maguire et al. |
| 2007/0008132 | A1 | 1/2007 | Bellantoni |
| 2007/0024424 | A1 | 2/2007 | Powell |
| 2007/0205871 | A1 | 9/2007 | Posamentier |
| 2008/0143482 | A1 | 6/2008 | Shoarinejad et al. |
| 2008/0143485 | A1 | 6/2008 | Frerking |

FOREIGN PATENT DOCUMENTS

| | | |
|---|---|---|
| JP | 2002288598 | 10/2002 |
| WO | WO2004/047000 | 6/2004 |
| WO | WO2006123316 | 11/2006 |
| WO | WO/2007/094868 | 8/2007 |
| WO | WO/2008/027650 | 3/2008 |

OTHER PUBLICATIONS

PCT/US06/015092 International Preliminary Report on Patentability; Oct. 23, 2007.
PCT/US06/015093 International Search Report & Written Opinion mailed Feb. 22, 2007.
PCT/US06/015093 International Preliminary Report on Patentability; Oct. 23, 2007.
PCT/US06/015342 International Search Report & Written Opinion mailed Jul. 6, 2007.
PCT/US06/015342 International Preliminary Report on Patentability; Oct. 24, 2007.
PCT/US06/015343 International Search Report & Written Opinion mailed Nov. 13, 2006.
PCT/US06/015343 International Preliminary Report on Patentability; Oct. 24, 2007.
PCT/US06/015344 International Search Report & Written Opinion mailed Oct. 4, 2006.
PCT/US06/015344 International Preliminary Report on Patentability; Oct. 24, 2007.
PCT/US06/015347 International Search Report & Written Opinion mailed Sep. 28, 2006.
PCT/US061015347 International Preliminary Report on Patentability; Oct. 24, 2007.
PCT/US06/027164 International Search Report & Written Opinion mailed Oct. 26, 2007.
PCT/US06/027164 International Preliminary Report on Patentability; Mar. 4, 2008.
PCT/US06/034023 International Search Report & Written Opinion mailed Aug. 10, 2007.
PCT/US06/034023 International Preliminary Report on Patentability; Mar. 4, 2008.
PCT/US06/26933 International Search Report & Written Opinion mailed Dec. 20, 2007.
Gagne, Martin, "Identity-Based Encryption: a Survey," Cryptobytes—the Technical Newsletter of RSA Laboratories, Spring 2003.
Gemmell, Peter, "An Introduction to Threshold Cryptography," Cryptobytes—the Technical Newsletter of RSA Laboratories, Winter 1997.
Shamir, Adi, "How to Share a Secret," Communications of the ACM, vol. 22 Issue 11 (Nov. 1979).
Shamir, Adi, "Identity-Based Cryptosystems and Signature Schemes," Proceedings of Crypto '84, pp. 47-53.
Schneier, Bruce, Applied Cryptography, 2nd Edition, Wiley and Sons, 1996, pp. 71-73 and 528-531.
Microsoft Corporation, "Description of the Secure Sockets Layer (SSL) Handshake," Article ID: 257591, Jun. 23, 2005.
U.S. Appl. No. 11/301,770 Office Action mailed Jun. 6, 2008; 10 pages.
U.S. Appl. No. 11/409,463 Office Action mailed Jun. 27, 2008; 5 pages.
U.S. Appl. No. 11/301,423 Office Action mailed Jun. 26, 2008; 12 pages.
U.S. Appl. No. 11/323,214 Office Action mailed Jun. 27, 2008; 13 pages.
U.S. Appl. No. 11/408,652; Restriction Requirement mailed Apr. 28, 2008; 11 pages.
U.S. Appl. No. 11/408,652; Response to Restriction Requirement filed May 28, 2008; 8 pages.
U.S. Appl. No. 11/301,396 Office Action mailed Jun. 26, 2008; 9 pages.
U.S. Appl. No. 11/387,422 Office Action mailed Jun. 16, 2008; 8 pages.
U.S. Appl. No. 11/301,396, Response to Office Action filed Sep. 26, 2008, 5 pages.
U.S. Appl. No. 11/301,423, Office Action mailed Dec. 30, 2008, 15 pages.
U.S. Appl. No. 11/301,423, Response to Office Action filed Sep. 26, 2008, 4 pages.

U.S. Appl. No. 11/301,587, Office Action Mailed Sep. 16, 2008; 11 pages.
U.S. Appl. No. 11/301,587, Response to Office Action filed Dec. 16, 2008, 10 pages.
U.S. Appl. No. 11/301,770 Office Action mailed Dec. 10, 2008, 10 pages.
U.S. Appl. No. 11/301,770; Response to Office Action filed Sep. 5, 2008; 3 pages.
U.S. Appl. No. 11/323,214, Response to Office Action filed Dec. 29, 2008, 23 pages.
U.S. Appl. No. 11/328,209, Office Action mailed Dec. 19, 2008, 10 pages.
U.S. Appl. No. 11/408,652, Office Action mailed Oct. 1, 2008, 9 pages.
U.S. Appl. No. 11/513,667 Notice of Allowance and Interview Summary mailed Sep. 9, 2008; 9 pages.
European Application No. EP 08006103, Search Report, Aug. 7, 2008; 5 pages.
European Application No. EP 08006104, Search Report, Nov. 28, 2008, 4 pages.
European Application No. EP 08011298, Search Report, Sep. 19, 2008, 6 pages.
European Application No. EP 06751146, Search Report, Dec. 16, 2008, 11 pages.
PCT/US06/015094 International Search Report & Written Opinion mailed Sep. 22, 2008, 10 pages.

* cited by examiner

US 7,859,411 B2

RFID TAGGED ITEM TRAJECTORY AND LOCATION ESTIMATION SYSTEM AND METHOD

RELATED APPLICATION

This application claims benefit and priority to U.S. Provisional Patent Application Ser. No. 60/908,999, filed Mar. 30, 2007, the disclosure of which is incorporated by reference herein.

BACKGROUND

Supply chain and inventory management in general are large industries whose profits depend upon their efficiency and accuracy. Prominent examples include package shipping, airport baggage handling, and tracking of medical equipment and high value drugs. In all these cases it is important to know where the items are located and to be able get the items to a desired destination in a timely, predictable fashion. In current systems it is common to affix bar codes to the items and then periodically scan the items at different locations.

One of the major shortcomings of this current approach is that the activity of scanning the items is labor intensive, so that it is done only frequently as absolutely necessary, and the approach is error-prone (items may be missed). RFID readers are inexpensive and can operate at a distance from an RFID-tagged item, in most cases without user intervention. This means that more frequent scans of the item position are possible which provides not only better tracking of the items position and higher reliability for delivery estimates, but it also allows for faster corrective actions. Most sorting of items is done by humans and it is also possible for items to not be unloaded or to fall off of conveyor belts or even to be stolen in some cases. In current systems it may take a significant amount of time before these events can be reliably detected.

With inexpensive RFID readers it is possible to immediately detect if an item is sorted incorrectly or disappears between checkpoints and trigger an alert so that the situation can be corrected. Likewise, for loosely tracked items such as medical equipment it may be that the item has been validly checked out for use but has not been returned or is needed due to an emergency. An RFID based tracking system can unobtrusively track and then locate the item even if the person who has moved the item cannot be contacted. On many occasions there is also a need to maintain detailed records of the environment around transported items such as high value drugs that must be maintained at a certain temperature during transit.

DETAILED DESCRIPTION

Figure 1:
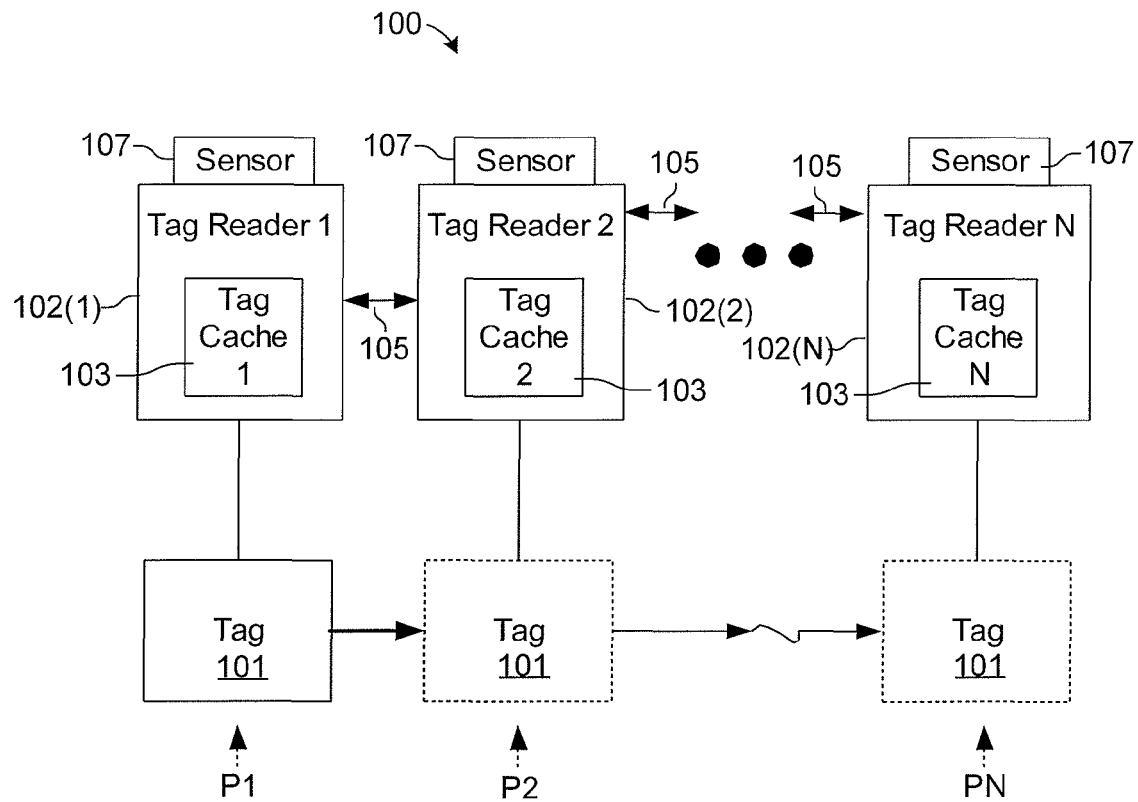
FIG. 1 is a diagram showing an exemplary system 100 with multiple RFID tag readers.

FIG. 1 is a diagram showing an exemplary system 100 with multiple RFID tag readers 102 at positions P1, P2 . . . PN. Each reader 102 includes a tag cache memory 103. In addition to tag caches 103 on each reader 102, there may be caches 103 located elsewhere that represent a filtered set or aggregated set that can be searched against. Readers 102 interrogate and read data stored on each item tagged with an RFID tag 101 as the tag passes in proximity to a given reader. Each interrogating reader 102 typically writes tag data as well as item path information including timestamp and reader ID information to a tag cache memory 103 during the interrogation process. Items having affixed tags 101 can thus be tracked as the tagged items move through a delivery chain or through a building, for example. A reader-to-reader communications link 105 (which may be either wired or wireless) and associated communication protocol allows readers 102 to exchange tag-related information.

The present system provides item arrival and location information when an item bearing a searched-for tag is not in the presence of a tag reader. The system also extrapolates current data to provide future data, and allows viewing of tagged item movement patterns.

Figure 2A:
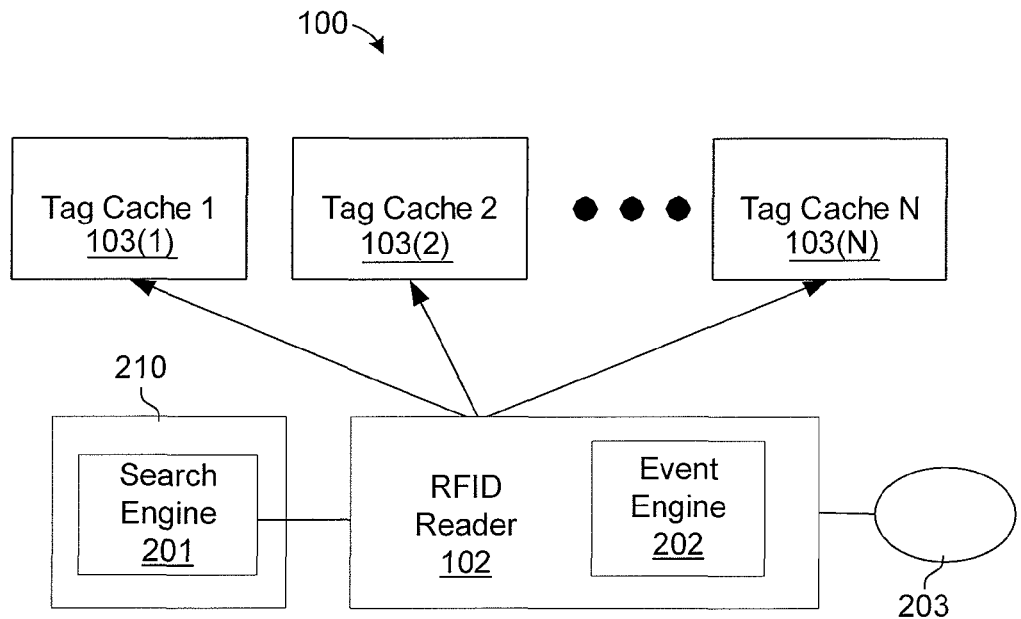
FIG. 2A is an exemplary diagram of the present system.
Figure 2B:
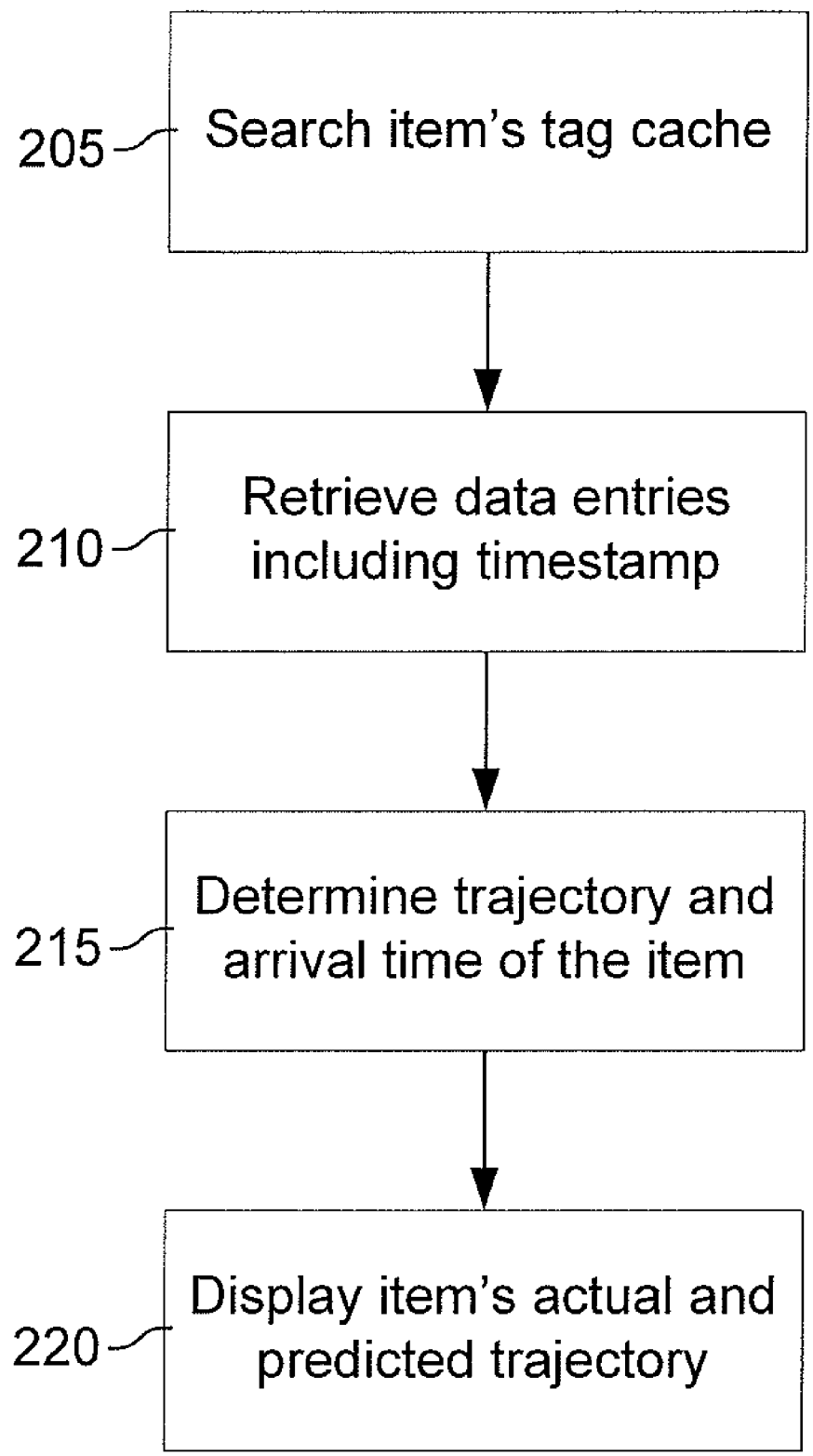
FIG. 2B is a flowchart showing an exemplary method for determining and displaying the trajectory of an item in transit.

FIG. 2A is an exemplary diagram of system 100 showing an RFID tag reader 102 which includes an event engine 202. Tag reader 102 is communicatively coupled to a search engine 201 executing on a processor 210 which may be external to the reader 102. FIG. 2B is a flowchart showing an exemplary method for determining and displaying the trajectory of an item in transit. The present system uses a search engine 201 to interrogate multiple RFID tag caches 103, e.g., caches 103(1), 103(2), etc., for one or more specific items corresponding to an RFID tag 101. As shown in FIG. 2B, at step 205, search engine 201 searches a reader's tag cache 103(n) for data about or stored on a tag 101(n) that at some previous point in time had been read by a reader 102. The search may use a unique identifier directly corresponding to a tagged item of interest, or it may use multiple keywords to filter the search results and identify the specific item or related group of items. At step 210, search engine 201 also retrieves certain data entries stored in tag cache 103(n) including a timestamp corresponding to the time the entries were created, and the ID of the interrogating reader.

Using the item's data entries stored in a tag's cache, including the timestamp, as well as the known positions of the readers, a trajectory of the item can be determined. At step 215, the item's next location and time of arrival is predicted by estimating velocity and direction of travel based on two or more reader locations and timestamps, as described below. The item's actual and predicted trajectory is then overlaid on a map including some or all of the readers 102 in the reader network 102(1)-102(N), and the result is displayed on device 203, at step 220.

Figure 2C:
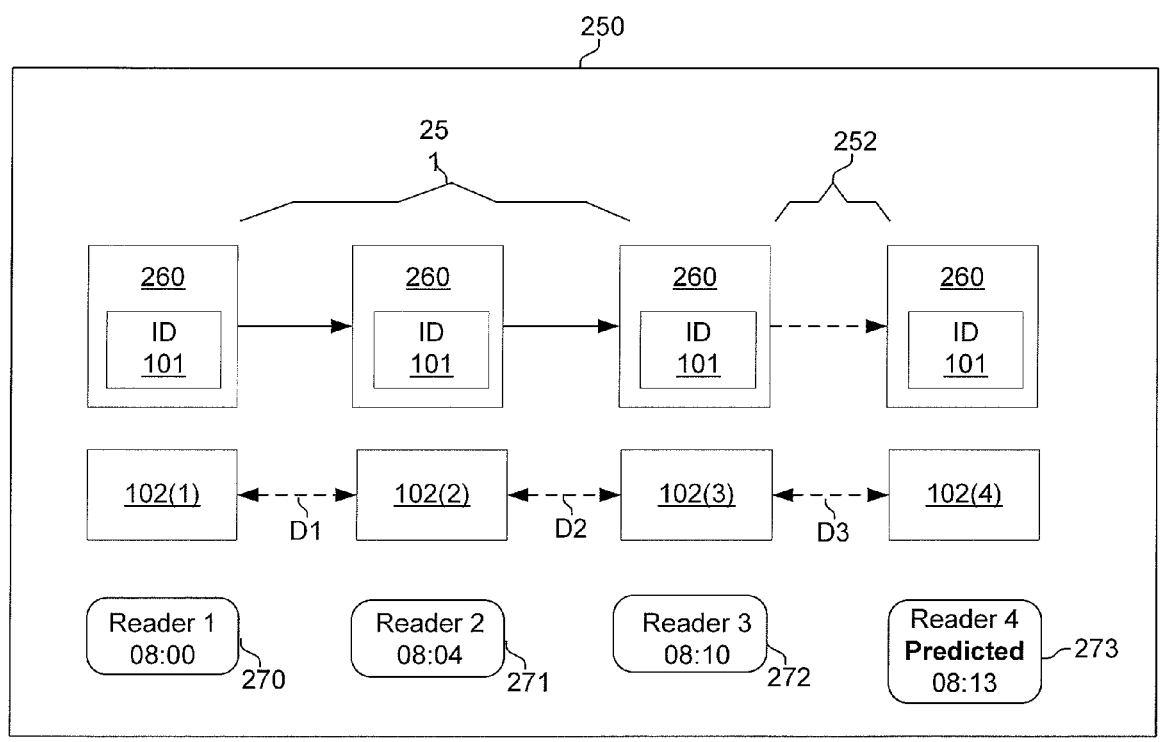
FIG. 2C is an illustration of a map showing an example of the actual trajectory and the predicted trajectory of an RFID-tagged item in a reader network.

FIG. 2C is an illustration of a map 250 showing an example of the actual trajectory 251 and the predicted trajectory 252 of an RFID-tagged item 260 in a reader network 102(1)-102(4). As illustrated in FIG. 2C, map 250 shows the locations of tagged item 260 (having a tag identifier "ID") relative to a group of tag readers 102(*). In addition to graphically displaying the actual trajectory 251 of item 260, the map displays the actual time of arrival of the item at each reader 102, as indicated by text areas 270-272. The predicted trajectory 252 of item 260 is also displayed, as well as the predicted time of arrival of the item, as indicated by text area 273.

The predicted trajectory 252 of item 260 can be calculated using the formula:

predicted transit time=distance to next reader/average velocity

In the example of FIG. 2C, the average velocity of item 260 is calculated by dividing the total distance [D1+D2] traveled between previously-encountered readers 102(1), 102(2), and 102(3) by the corresponding actual transit time, which is 10 minutes (08:10-08:00), to yield a result of (D1+D2)/10. If, for example, D1=50 meters and D2=100 meters, then the average velocity of the item being tracked is 150 meters/10 minutes=15 Meters per minute.

The time of arrival of item 260 at reader 102(4) is then calculated by first determining the predicted transit time between readers 102(3) and 102(4), which is equal to the distance D3 between the readers divided by the determined average velocity of 15 meters per minute. If, in the present example, D3=45 meters, then the expected transit time is 45 meters/15 meters per minute=3 minutes. The time of arrival of item 260 at reader 102(4) is then predicted by adding this 3 minute value, for the expected transit time, to the arrival time (08:10) at the previous reader 102(3) to yield a predicted time of arrival of 08:13.

The present location of item 260 can be predicted by extrapolating the item's distance from the most recently interrogating reader, e.g., reader 102(3), using the item's calculated average velocity and time since the item was interrogated by the reader, along the expected path between the most recent reader and the next expected reader. In the example of FIG. 2C, if 2 minutes have elapsed since the item was interrogated by reader 102(3), then the location of item 260 is predicted to be 2 minutes×15 Meters/minute=30 Meters from reader 102(3) along the path between reader 102(3) and reader 102(4).

Figure 3:
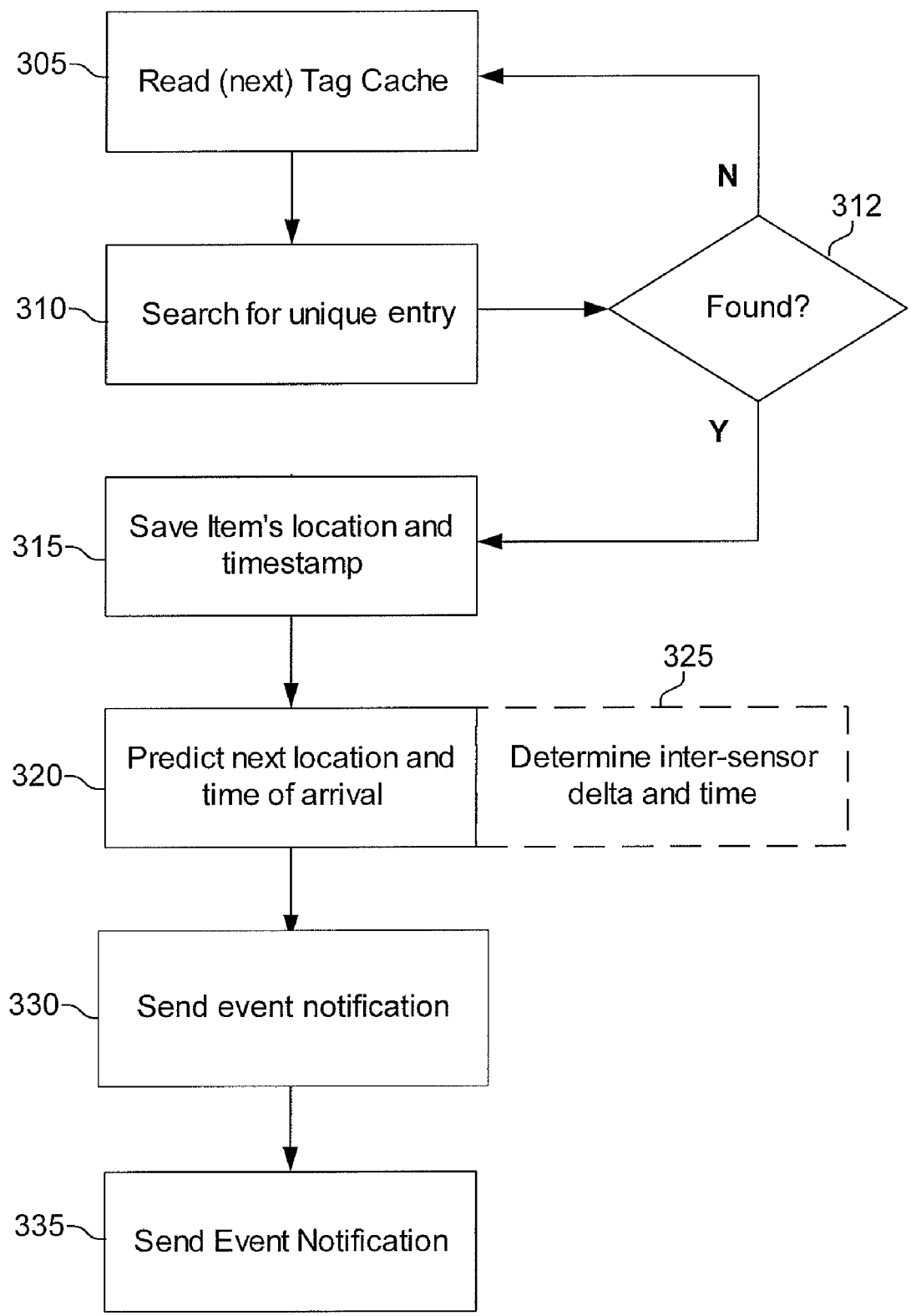
FIG. 3 is a flowchart showing an exemplary method for determining and predicting the location of an RFID-tagged item.

FIG. 3 is a flowchart showing an exemplary method for determining and predicting the location of an RFID-tagged item. As shown in FIG. 3, at step 305, data stored in a tag cache memory 103(n) is read by an initial reader 102(n). At step 310, search engine 201 performs a search in tag cache 103(n) for a unique entry, for example, a specific tag ID. If it is determined, at step 312, that the entry being searched for is not in the present tag's cache, then the next item's tag cache is read at step 305.

If the item whose tag is presently being read is the item being searched for, then at step 315, the item's present location (e.g., an identifier for the present reader 102) and a timestamp of the current time are saved (stored) in tag cache memory 103(n).

The method described above, and shown in FIG. 3, can be generalized. Assuming, for example, that a sensor 107 is attached to each of the readers, then rather than tracking location, data can be accumulated such as the temperature at the reader when a specific item passes. In this embodiment, at step 325 (which is executed in lieu of step 320), sensor data stored in tag cache 103(n) is compared with data from local sensor 107, and an inter-sensor (inter-reader) delta or differential sensor value is determined and stored in cache memory 103(n). A temperature gradient (or other inter-sensor delta information) may be determined, both in general, and when a specific item is in the flow through a reader network.

While preferred embodiments of the disclosed subject matter have been described, so as to enable one of skill in the art to practice this subject matter, the preceding description is intended to be exemplary only, and should not be used to limit the scope of the disclosure, which should be determined by reference to the following claims.

The invention claimed is:

1. A system for predicting a trajectory of an item tagged with an RFID tag comprising:
   a network of communicatively coupled RFID readers, each having tag cache memory; and
   a search engine communicatively coupled with the tag caches in each of the readers;
   wherein, when the tag is within operating range of one of the readers, the tag is interrogated for its data and path information comprising timestamps of reader-tag interactions and related event data, and updated path information is stored in the tag cache memory;
   wherein the search engine, performs a search the tag cache memory in one of one of the readers to locate information corresponding to search criteria including characteristics of the tagged item sought;
   wherein, when the information corresponding to the search criteria is found, the path information is retrieved, and the trajectory of the item is extrapolated using a transit time of the item and average velocity of the item, determined from the timestamps and known distances between locations of each of the reader-tag interactions, along an expected path of the item.

2. The system of claim 1, wherein the present location of the item is predicted by extrapolating the item's distance from the recent reader most recently interrogating the tag, using the average velocity and time since the item was interrogated by the recent reader, along an expected path between the recent reader and the reader next expected to read the tag.

3. The system of claim 1, wherein the time of arrival of the item at the reader next expected to read the tag is predicted by adding a transit time to the arrival time at the previous reader.

4. The system of claim 1, wherein the search engine causes results of the search to be displayed.

5. The system of claim 1, wherein the results of the search are filtered to remove duplicate entries, poor quality matches, and entries outside a specific time window.

6. A system for predicting a trajectory of an item tagged with an RFID tag comprising:
   a plurality of communicatively coupled RFID readers having tag cache memory; and
   a search engine, associated with each of the readers, on an external processor coupled to the tag cache memory;
   wherein:
     data stored in the tag is read by readers encountering the tag and stored in an associated tag cache memory;
     a search in tag cache is performed for a unique entry;
     if the unique entry is not in the present reader's tag cache, then the next reader's tag cache is read;
     if the unique entry is found in the present reader's tag cache, then the item's present location and a timestamp of the current time are stored in the tag cache memory;
     a prediction is then made of the time of arrival of the tagged item at the next expected reader location; and
     an event notification is sent to the reader at the next expected reader location.

7. The system of claim 1, wherein the present location of the item is predicted by extrapolating the item's distance from the recent reader most recently interrogating the tag, using the average velocity and time since the item was interrogated by the recent reader, along an expected path between the recent reader and the reader next expected to read the tag.

8. The system of claim 1, wherein the time of arrival of the item at the reader next expected to read the tag is predicted by adding a transit time to the arrival time at the previous reader.

9. The system of claim 1, wherein the search engine displays results of the search.

10. The system of claim 1, wherein the results of the search are filtered to remove duplicate entries, poor quality matches, and entries outside a specific time window.

11. The system of claim 10, including a results display comprising an ordered list of entries matching the search criteria in ascending/descending order of time and/or quality of search match.

12. The system of claim 11, wherein the results display comprises a map showing locations of one or more readers and the entries corresponding with those readers displayed as a path for the item.

13. The system of claim 10, wherein one or more of an item velocity, a predicted path, and projected arrival times at known locations are displayed on the results display.

14. A method for predicting a trajectory of an item tagged with an RFID tag, in a system including a network of RFID readers, each having a tag cache associated therewith for storing data concerning tags the reader has read, the method comprising:
   interrogating the tag cache for path information comprising timestamps of reader-tag interactions and related event data, and updated path information is stored in the tag cache, when the tag is within operating range of one of the readers; and
   performing a search of the tag caches to locate information corresponding to search criteria including characteristics of the item sought;
   wherein, when the information corresponding to the search criteria is found, the path information is retrieved, and the trajectory of the item is extrapolated using a transit time of the item and average velocity of the item, determined from the timestamps and known distances between locations of each of the reader-tag interactions, along an expected path of the item.

15. The method of claim 14, wherein the present location of the item is predicted by extrapolating the item's distance from the recent reader most recently interrogating the tag, using the average velocity and time since the item was interrogated by the recent reader, along an expected path between the recent reader and the reader next expected to read the tag.

16. The method of claim 14, wherein the time of arrival of the item at the reader next expected to read the tag is predicted by adding a transit time to the arrival time at the previous reader.

17. The method of claim 14, wherein the results of the search are filtered to remove duplicate entries, poor quality matches, and entries outside a specific time window.

18. The method of claim 14, wherein an ordered list of entries matching the search criteria in ascending/descending order of time and/or quality of search match is displayed on a results display.

19. The method of claim 18, wherein a map showing locations of one or more readers and the entries corresponding with those readers is displayed as a path for the item.

20. The system of claim 18, wherein one or more of an item velocity, a predicted path, and projected arrival times at known locations are displayed on the results display.

* * * * *